United States Patent
Goetz et al.

(10) Patent No.: US 8,881,126 B2
(45) Date of Patent: Nov. 4, 2014

(54) SYSTEMS AND METHODS FOR TESTING A COMPILER THROUGH COMPILE-TIME DECISION FEEDBACK

(75) Inventors: Brian Goetz, Williston, VT (US); Maurizio Cimadamore, Donabate (IE)

(73) Assignee: Oracle International Corporation, Redwood City, CA (US)

(*) Notice: Subject to any disclaimer, the term of this patent is extended or adjusted under 35 U.S.C. 154(b) by 106 days.

(21) Appl. No.: 13/562,915

(22) Filed: Jul. 31, 2012

(65) Prior Publication Data

US 2014/0040872 A1 Feb. 6, 2014

(51) Int. Cl.
*G06F 9/45* (2006.01)

(52) U.S. Cl.
USPC .................... 717/158; 717/140; 717/151

(58) Field of Classification Search
USPC .......... 717/124–129, 140–143, 150–151, 158
IPC ............. G06F 11/22,11/27, 11/36, 11/362, G06F 11/366, 11/2273, 11/3003, 11/3636, G06F 11/3604
See application file for complete search history.

(56) References Cited

U.S. PATENT DOCUMENTS

| | | | | |
|---|---|---|---|---|
| 6,071,316 A * | 6/2000 | Goossen et al. | ............... | 717/126 |
| 6,341,371 B1 * | 1/2002 | Tandri | ............................ | 717/158 |
| 6,851,110 B2 * | 2/2005 | Hundt et al. | .................. | 717/159 |
| 6,948,160 B2 * | 9/2005 | Click et al. | .................... | 717/148 |
| 7,086,043 B2 * | 8/2006 | Roediger et al. | ............... | 717/150 |
| 7,155,706 B2 * | 12/2006 | Snover et al. | .................. | 717/143 |
| 7,275,241 B2 * | 9/2007 | Choi et al. | ..................... | 717/143 |
| 7,367,022 B2 * | 4/2008 | Lueh et al. | ..................... | 717/151 |
| 7,421,682 B2 * | 9/2008 | Viehland et al. | ............... | 717/130 |
| 7,793,273 B2 * | 9/2010 | Mercer et al. | .................. | 717/141 |
| 7,793,277 B2 * | 9/2010 | Schmidt | ......................... | 717/158 |
| 7,840,950 B2 * | 11/2010 | Stoodley et al. | ............... | 717/151 |
| 8,127,280 B2 * | 2/2012 | Thomas et al. | ................ | 717/136 |
| 8,423,980 B1 * | 4/2013 | Ramasamy et al. | ........... | 717/140 |
| 8,490,064 B2 * | 7/2013 | Shrivastava et al. | ........... | 717/130 |
| 8,505,000 B2 * | 8/2013 | Tailor | ............................. | 717/139 |
| 8,689,194 B1 * | 4/2014 | Pillarisetti et al. | ............. | 717/140 |

OTHER PUBLICATIONS

Jha et al, "Knowledge Compilation Meets Database Theory: Compiling Queries to Decision Diagrams", ACM, pp. 162-173, 2011.*
Sproat et al, "Compilation of Weighted Finite-State Transducers from Decision Trees", ACM, pp. 215-222, 1996.*
Suganuma et al, "A Region-Based Compilation Technique for Dynamic Compilers", ACM Transactions on Programming Languages and Systems, vol. 28, No. 1,pp. 134-174 , 2006.*
Maranget, "Compiling Pattern Matching to Good Decision Trees" ACM, pp. 35-46, 2008.*

* cited by examiner

Primary Examiner — Anil Khatri
(74) Attorney, Agent, or Firm — Polsinelli PC

(57) ABSTRACT

Systems and methods for automatic generation of one or more test programs to be used in conjunction with a test framework for testing a compiler are disclosed. A compiler is instrumented to generated data exposing various internal decisions and/or actions made by the compiler. A test program is generated by test framework and compiled by the compiler and the output is validated by the test framework to ensure that the compiler is behaving according to its compiler specification.

18 Claims, 3 Drawing Sheets

SYSTEMS AND METHODS FOR TESTING A COMPILER THROUGH COMPILE-TIME DECISION FEEDBACK

TECHNICAL FIELD

Aspects of the present disclosure relate to software compilers, and more particularly, testing software compilers.

BACKGROUND

A software compiler is a type of computer program (or set of programs) that transforms source code written in a programming language (the source language) into another computer language (the target language) to create executable programs that will run accurately on some form of computing device. During compilation of the source code, the compiler may produce various outputs, such as error messages, diagnostics, warnings or other information describing various aspects of the compilation, and/or executable object code.

Compilers are intended to be used frequently and are critical to the software development process. Accordingly, the integrity of compilers must be assiduously maintained and verified to ensure that the compiler implementation conforms to the compiler's specifications, the compiler generates accurate object code, and ultimately that the compiler generates properly functioning executable programs. Thus, compilers must be extensively tested to isolate and identify any bugs and/or logical errors that may exist. Due to the complexity of the compiler as a program, properly testing the compiler is often a complex task. Current methodologies for testing compilers rely on the creation and maintenance of a large number of test cases, which often take the form of example programs to be compiled and a description of what constitutes correct compiler output. The test cases are executed to generate output, which is subsequently compared against expected results to determine whether the tests were successful. However, such methodologies are both limited in analysis and time-consuming, and thus may not provide sufficient test coverage for some of the more complex language features supported by compilers. Accordingly, as compilers become increasingly complex, more sophisticated testing techniques are needed. It is with these observations in mind, among others, that various aspects of the present disclosure were developed.

SUMMARY

Aspects of the present disclosure include methods for validating the integrity of a compiler by exposing the internal execution decisions made by the compiler during compilation. The method may be performed by a processor, such as a processor located within a computing device. Specifically, the method includes compiling test programs using an instrumented compiler to generate decision data. The decision data corresponds to internal decisions made by the instrumented compiler during compilation. The method also includes invoking a test framework to validate the internal decisions made by the instrumented compiler.

Aspects of the present disclosure also include systems for testing a compiler for validating the integrity of a compiler by exposing the compiler's internal execution decisions. The system includes a memory and a processor, which may be located within a computing device. The processor is configured to compile test programs using an instrumented compiler to generate decision data. The decision data corresponds to internal decisions made by the instrumented compiler during compilation. The processor is also configured to invoke a test framework to validate the internal decisions made by the instrumented compiler. For example, the internal decisions are validated based on a compiler specification.

Aspects of the present disclosure include non-transitory computer readable mediums encoded with a compilation application that when executed validates the integrity of a compiler by exposing the compiler's internal execution decisions. The modules of the compilation application are executable by a processor. The modules include a test module to compile test programs using an instrumented compiler to generate decision data. The decision data corresponds to internal decisions made by the instrumented compiler during compilation. The modules also include a validation module to invoke a test framework to validate the internal decisions made by the instrumented compiler.

BRIEF DESCRIPTION OF THE DRAWINGS

The foregoing and other objects, features, and advantages of the present disclosure set forth herein will be apparent from the following description of exemplary embodiments of those inventive concepts, as illustrated in the accompanying drawings. It should be noted that the drawings are not necessarily to scale; however, the emphasis instead is being placed on illustrating the principles of the inventive concepts. Also, in the drawings the like reference characters refer to the same parts throughout the different views. The drawings depict only exemplary embodiments of the present disclosure and, therefore, are not to be considered limiting in scope.

DETAILED DESCRIPTION

Aspects of the present disclosure validate the integrity of a compiler and its execution processes, decisions, logic, etc., by exposing one or more internal execution decisions made by the compiler during compilation of a given source code so that such decisions may be subject to testing. In various aspects, one or more artifacts, notations, and/or descriptions describing or otherwise articulating the various internal decisions made by the compiler during compilation of a source code are generated and/or recorded as decision data. The decision data may be used by a test framework to analyze and/or verify the integrity of such internal decisions to ensure the compiler's correctness, and therefore, establish that the compiler is behaving and compiling source code as intended.

The most common compiler testing methodology, referred to as "black box testing," includes in compiling a source code and receiving compiler output. Such "black box" test cases can be created by hand, or can be generated automatically based on a description of the language semantics. Subsequently, the compiler output is compared against a reference file commonly referred to a "golden file,' which contains known and correct output that the compiler should generate when compiling the test source code. For example, a golden file may include one or more errors for which a compiler should generate corresponding errors when compiling the test source code. Alternatively, if the program compiles successfully, the golden file describes the output the compiler should produce when run. The result of compilation is compared against the set of messages, or expected output, contained within the golden file to determine whether the compiler is generating the correct results. A golden file is used when performing negative tests, in which the compiler is expected to fail and generate specific output, and may be used when performing positive tests (when an assertion is made that the program, when compiled and run, produces an expected result).

In some instances, however, only comparing a known compiler output to actual output generated by the compiler is inadequate, as it may be possible for the program to generate an output that matches the golden file even though the compiler did not behave as intended, or according to the compiler's specifications. Stated differently, although the compiler may produce the expected output, the compiler may have made one or more internal execution decisions that violate the compiler's specification. Using the black box approach would fail to reveal or identify such issues. Thus, more sophisticated testing techniques are needed and may require the support and cooperation of the compiler.

Figure 1:
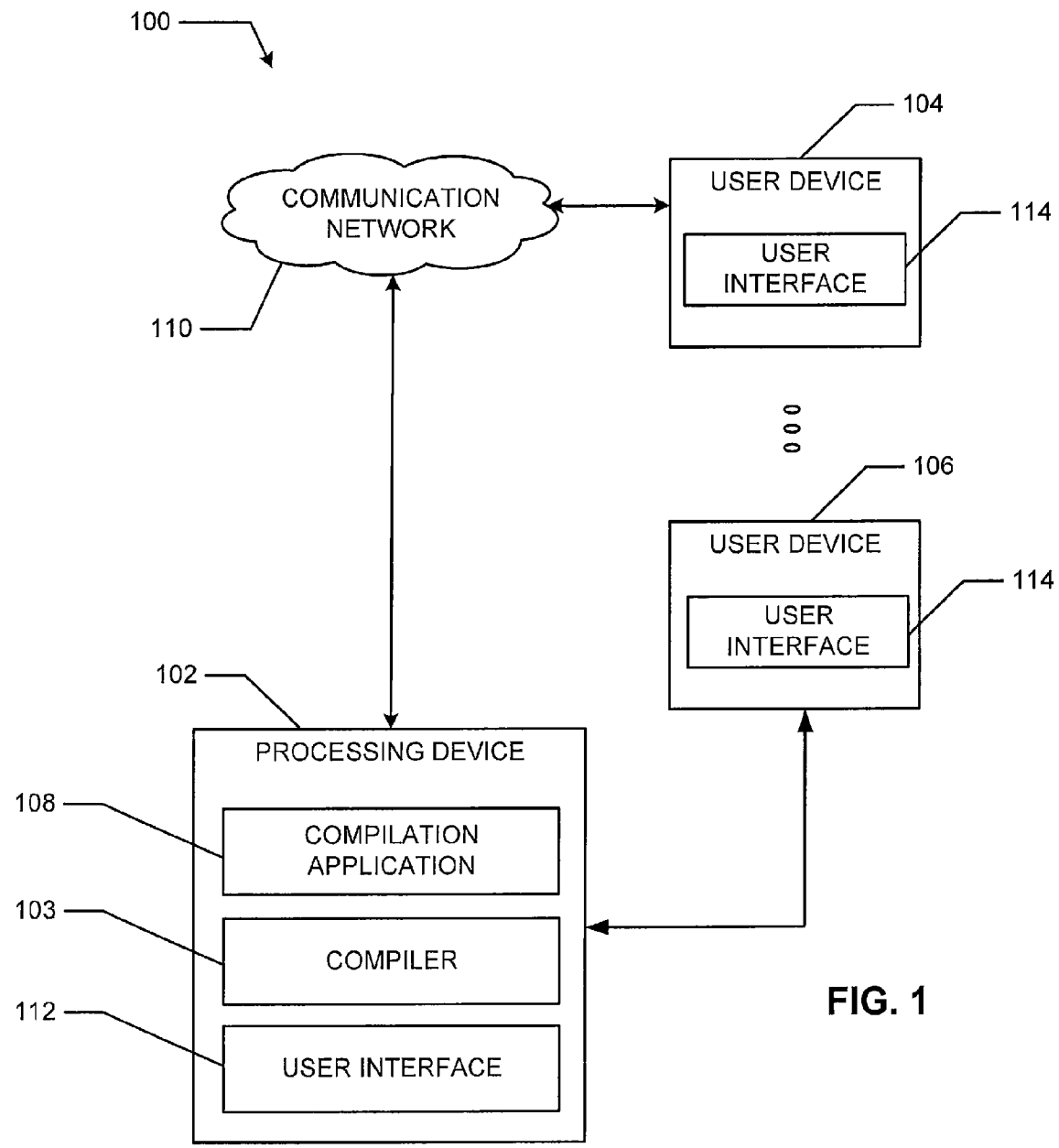
FIG. 1 is a block diagram illustrating a computing environment for testing a compiler, according to aspects of the present disclosure.

FIG. 1 illustrates an example computing environment 100 for testing a compiler, in accordance with aspects of the present disclosure. A processing device 102 and/or user devices 104-106 may include various hardware and accompanying software computing components that may be configured execute a compilation application 108 to expose and/or record internal decisions made by a compiler during compilation of a source code.

The processing device 102 and/or the user devices 104-106 may be a personal computer, work station, server, mobile device, mobile phone, processor, and/or other processing device. Each device may include one or more processors that process software or other machine-readable instructions and may include a memory to store the software or other machine-readable instructions and data. The memory may include volatile and/or non-volatile memory. Additionally, each device may also include a communication system to communicate via a wireline and/or wireless communications, such as through the Internet, an intranet, and Ethernet network, a wireline network, a wireless network, and/or another communication network. The processing device 102 and/or the user devices 104-106 may further include a display (not shown) for viewing data, such as a computer monitor, and an input device (not shown), such as a keyboard or a pointing device (e.g., a mouse, trackball, pen, touch pad, or other device) for entering data and navigating through data, including exams, images, documents, structured data, unstructured data, HTML pages, other web pages, and other data.

According to one aspect, the processing device 102 may include a compiler 103. A compiler is a type of computer program (or set of programs) that transforms source code written in a programming language (the source language) into another computer language (the target language) to create executable programs that will run accurately on some form of computing device. During compilation of the source code, the compiler may produce error messages, executable object code (e.g. an executable program) and/or diagnostics, such as warnings or other information describing various aspects of the compilation. The compiler 103 may be instrumented to expose and/or record the various internal decisions made by the compiler to validate the compilers correctness. Stated differently, the compiler may be marked, annotated, and/or include various functionalities that cause the compiler to generate and/or record decision data during compilation. Decision data includes data and/or information describing the various internal decisions made by the compiler during compilation and any associated information describing and/or otherwise evidencing the reason a particular internal decision was made.

The compiler may be instrumented to generate various outputs, all of which include and/or comprise decision data. For example, the compiler may be instrumented to generate compiler messages that include decision data describing internal decisions made by the compiler. The compiler messages may be enabled or disabled using compiler flags. In yet another example, the compiler may be instrumented to generate side files during compilation that record decision data. The compiler may be instrumented to generate the decision data as metadata. In yet another example, the compiler 116 may be instrumented to produce java artifacts. An artifact is something produced by the compilation process whether it be software related documentation or an executable file.

In one particular example and to illustrate some of the concepts discussed herein, the compiler may be instrumented to generate decision data exposing the internal decisions made by the compiler to perform overload resolution. Overload resolution includes processing various characteristics of a method call to determine a suitable method M for making such a method call. For example, the various characteristics that may be processed to identify the specific method call may be: the methods associated receiver type R/signature; a method name N; and an actual argument type list $A_1, A_2, \ldots A_n$. The method M must satisfy certain requirements; for instance, M's name must be identical to N, M must be a member of a supertype of R and, finally, actual arguments $A_1, A_2, \ldots A_n$ must be convertible to M's formal argument types (via method invocation conversion). Accordingly, the compiler may be instrumented to expose one or more internal decisions that illustrate and/or otherwise articulate the logic the compiler used to select a specific method. For example, in the part of the compiler that performs method overload resolution, the compiler may be instrumented to expose or otherwise output such a decision by emitting a diagnostic message that includes a tuple of information, which may include the: file being compiled; source position at which the method call occurs; type of method receiver; candidate method signatures that were considered; the selected method signature; the various types for the method arguments; data/time information; compilation run information, such as compiler flags; and the like.

In another example, the compiler may be instrumented to generate decision data exposing the internal decisions made by the compiler when making type-inference decisions. For example, the compiler may be instrumented to expose internal decisions made by the compiler to determine how various types of variables and/or expressions are being inferred. Generally, type-inference refers to the automatic deduction of the type of expressions, variables, parameters, return types etc., in a programming language, and usually occurs at compile time. Stated differently, type inference is the process of deducing types that are not explicitly stated in the source code from the other types present in the source code. For example, in the C# language, variables may be declared without a type. For example, consider the variable declarations:

```
var x = 1 + 2;
var y = 1 + 2.0;
var z = "hello " + "there";
```

In such a case, the compiler may infer the type of x to be "integer", the type of y to be "float", and the type of z to be a "String". A test case would assert that the compiler inferred the type "integer" for x, the type "float" for y, and the type "String" for z. As another example, in the Java language, type inference is used in generic method calls. For example, consider the method calls:

```
class Collections {
    static<Z> List<Z> emptyList( );
}
...
List<String> empty = Collections.emptyList( );
```

In such an instance, the compiler infers that Z must be a String. A test case would assert that the type inference decision at this point assigned "String" to Z. Accordingly, the compiler may be instrumented to expose one or more internal decisions that illustrate and/or otherwise articulate the logic the compiler used to perform such type inferencing. For example, in the part of the compiler that performs type inferencing, the compiler may be instrumented to expose or otherwise output such a decision by emitting a diagnostic message including: file being compiled; source position at which the type inference occurs; the various candidate types the compiler chose from and the specific type inferred; data/time information; compilation run information, such as compiler flags; etc.

The processing device 102 may execute a compilation application 108 that executes the compiler causing the compiler to record and/or capture the various internal decisions made during the compilation of a source code. Subsequently, the compilation application 108 may provide the various internal decisions to a test framework. The test framework may process and/or otherwise analyze the internal decisions of the compiler to determine whether or not the compiler is executing internal decisions according to the compiler's specification and therefore behaving as designed. Additionally, the test framework may enable users to generate tests that assert properties of the various internal decisions.

The processing device 102 and/or the user devices 104-106 may include a user-interface (UI) 112 and 114 to receive input from a user to perform compiler testing. UIs 112 and 114 may include a display (not shown) such as a computer monitor, liquid crystal display, for viewing data and/or input forms, and any combination of input/output devices (not shown), such as a keyboard, or a pointing device (e.g., a mouse, trackball, pen, or touch pad), speaker, and/or any other type of device for receiving input to test the various decisions of a compiler. A user, such as a programmer, may access user devices 104-106 (e.g. via UIs 114) to execute the compilation application 108 that automatically exposes the various internal decisions made by a compiler during the compilation of a source code and subsequently provides such internal decisions to a test framework to determine or otherwise verify that the compiler is executing internal decisions in accordance with its original compiler specification.

The user devices 104-106 may communicate with the processing device 102 through a communication network 110, which may be the Internet, an intranet, a local area network, a wireless local network, a wide area network, or another communication network, as well as combinations of networks. For example, the user devices 104-106 may communicate with the processing device 102 through a private network to perform automatic testing. In another aspect, the user devices 104-106 may communicate with the processing device 102 directly such as through an Ethernet connection.

While aspects of the present disclosure have been described as being performed using multiple devices within a computing environment, such as computing environment 100 shown in FIG. 1, it is contemplated that such aspects may be performed locally, using only a single device, such as the processing device 102 and in such cases the user device is integrated to or otherwise in direct connection with the processing device 102. The compilation application 108 may be located on the processing device 102 and/or on the user devices 104-106, or elsewhere.

Figure 2:
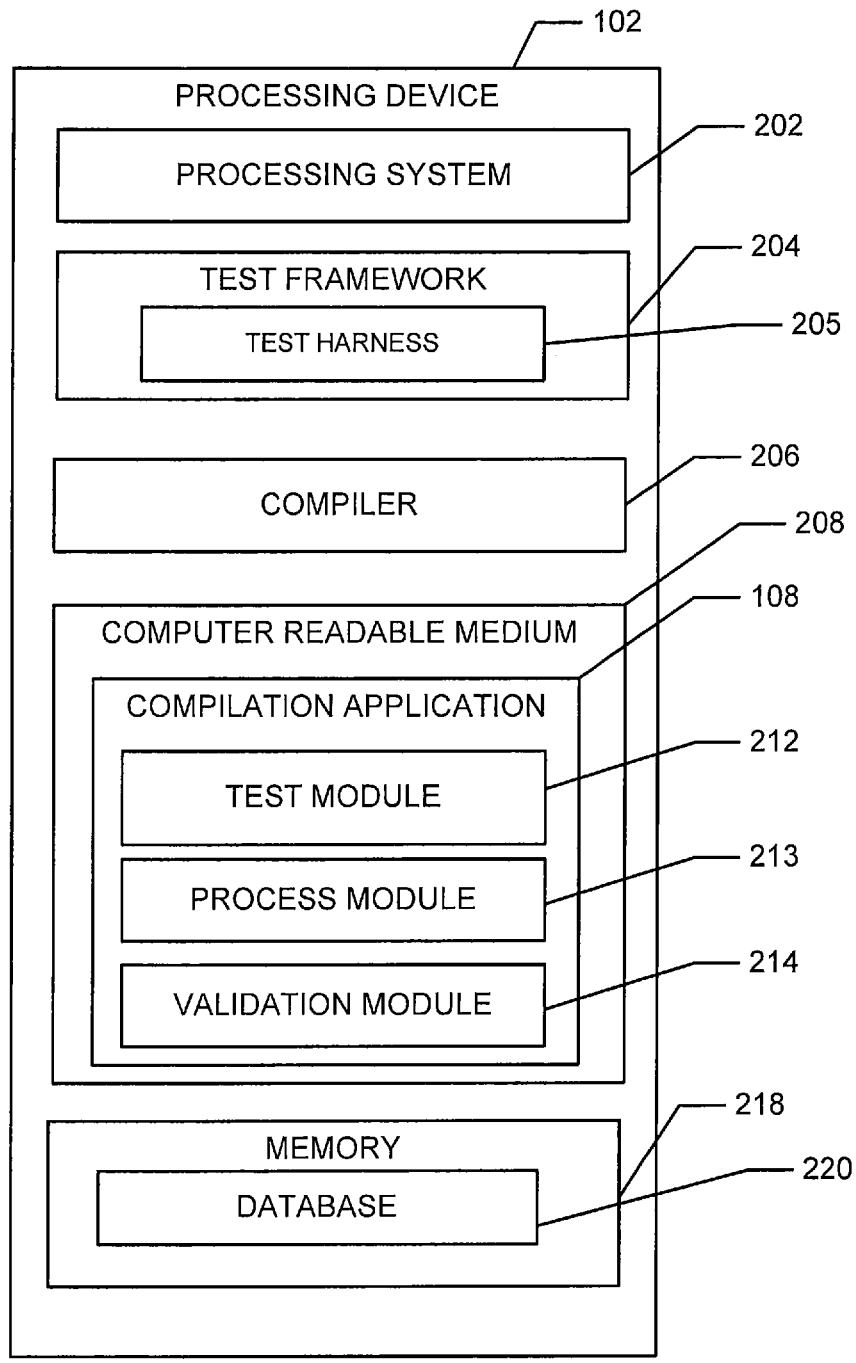
FIG. 2 is a block diagram illustrating a processing device, according to aspects of the present disclosure.

FIG. 2 is an example block diagram illustrating the various hardware and/or software components of the processing device 102 according to one exemplary embodiment of the present disclosure. The processing device 102 may include a processing system 202 that may be used to execute the compilation application 108 that automatically verifies the correctness of the various internal decisions made by an instrumented compiler when compiling a source code. The processing system 202 may include memory and/or be in communication with a memory 218, which may include volatile and/or non-volatile memory. The processing system 202 may also include various other computing components.

The processing device 102 may include a database 220. The database 220 may be a general repository of data including test data, artifact data, decision data and/or any other data relating to compiling, compiling source code, compiler test generation, and/or testing of internal decisions made by a compiler during execution, etc. The database 220 may include memory and one or more processors or processing systems to receive, process, query and transmit communications and store and retrieve such data. In another aspect, the database 220 may be a database server.

The processing device 102 may also include a test framework 204. A test framework represents is a set of assumptions, concepts and/or tools that provide support for automated software testing. Generally speaking, the test framework may include various hardware and/or software components configured to test a compiler, such as an instrumented compiler, by automatically executing the compiler under varying test conditions and monitoring the tested compiler's behavior and/or outputs.

According to one aspect, the test framework 204 may include a test harness 205 capable of executing one or more tests, or a collection of tests such as a test suite, that may be used to test the compiler. Each test may include instructions and/or a sequence of instructions that tests the various behaviors, functionalities, and/or features of the compiler. After each test case is performed, output may be obtained corresponding to the executed test case. The test framework 204 may be invoked to perform various processes and/or execute instructions to execute, monitor and/or manage an instrumented compiler and/or the instrumented compiler's output, and/or perform various other functions associated with the execution, monitoring, and management of the instrumented compiler.

The test framework 204 may be used to execute tests corresponding to a compiler that has been instrumented to expose its various internal decisions made during compilation of a source code. For example, the test framework 204 may execute a test causing the compiler to perform certain functions and/or behaviors that cause the instrumented compiler to record its specific internal decisions made during compilation of the test. Subsequently, the test framework 204 may be used to verify or otherwise determine that the specific internal decisions made by the compiler during the compilation of the test correspond to a correct decision with respect to the compilers original specification. For example, in one particular example, the test framework 204 may execute a test case to test a compiler's decision logic when performing overload resolution for method/function calls. As another example, the test framework 204 may execute a test case to test a compiler's decision logic when performing type-inferencing of expressions or variables.

The processing device 102 may include a computer readable media ("CRM") 208, which may include computer storage media, communication media, and/or another available computer readable media medium that can be accessed by the processing system 202. For example, CRM 208 may include non-transient computer storage media and communication media. By way of example and not limitation, computer storage media includes memory, volatile media, nonvolatile media, removable media, and/or non-removable media implemented in a method or technology for storage of information, such as machine/computer readable/executable instructions, data structures, program modules, or other data. Communication media includes machine/computer readable/executable instructions, data structures, program modules, or other data.

The CRM 208 may store executable instructions to implement the compilation application 108 and/or associated functions, processes, etc. Generally, program modules include routines, programs, instructions, objects, components, data structures, etc., that perform particular tasks or implement particular abstract data types. The processing system 202 may launch, run, execute, interpret or otherwise perform the logical instructions and/or processes of the regression application 108 to test a compiler, such as process 300 illustrated in FIG. 3, which depicts an example method and/or process for validating the various internal decisions made by a compiler during compilation, such as compiler 103.

Figure 3:
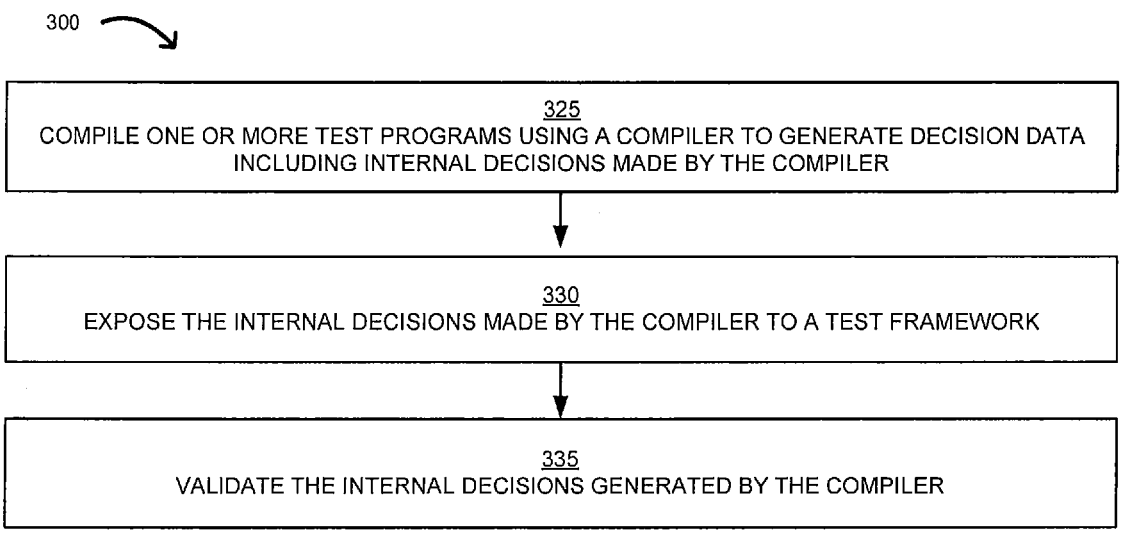
FIG. 3 is a flowchart illustrating an example processes for testing a compiler, according to aspects of the present disclosure.

Referring to FIG. 3, initially at 325, process 300 includes compiling one or more test programs using a compiler to generate decision data articulating the various internal decisions made by the compiler during compilation. For example, as illustrated in FIG. 2, the compilation application 108 may include a test module 212 that may execute or otherwise invoke the test framework 204 that understands the various instrumentations of the compiler and any corresponding decision data generated by the instrumented compiler. The test module 212 may invoke the test framework to access one or more test programs that may be compiled by the instrumented compiler. Each test executed by the test framework 204 may cause the instrumented compiler to generate decision data exposing one or more internal decisions made by the compiler. For example, when performing overload resolution, the test framework 204 may generate a test program T containing multiple method declarations M1, M2, . . . Mn for testing method overload resolution as described above. The test module 212 may initiate the test framework 204 to execute the instrumented compiler to compile the test program T and generate decision data describing the internal decisions made by the compiler to select a specific method. As another example, when performing type-inferencing, the test framework 204 may execute a test program A, to determine the type of an expression E. The test module 212 may initiate the test framework 204 to execute the instrumented compiler to compile the test program A and generate decision data exposing the internal decisions the instrumented compiler made to determine the specific type of expression E.

The test module 212 may invoke the test framework 204 to execute the instrumented compiler to compile the test cases, resulting in the instrumented compiler generating output including decision data exposing, recording, illustrating, describing, and/or otherwise articulating a reconstruction of the various internal decisions made by the compiler during compilation. Referring to the example above, when the compiler is performing overload resolution, the instrumented compiler may generate decision data including the internal decision identifying and corresponding data describing why the particular method was selected. As another example, the instrumented compiler may generate decision data describing the reasons why an overload candidate was not selected and/or discarded from the set (e.g. if the method has a signature that is not compatible with the actual argument types in the call-site). In yet another example, the decision data may include information showing an instantiated signature of the selected method. It is contemplated that the decision data may describe any and/or all of the decisions the compiler has taken in order to select a particular method and corresponding reasoning for making such a determination.

In yet another example and referring again to type-inferencing, when the compiler is instrumented to perform type-inferencing, the instrumented compiler may generate decision data identifying a particular type for an expression, variable, etc., the set of type candidates from which the specific type was selected, and information describing why the specific type for the variable and/or expression was selected. Any information may be included in the decision data to describe any and/or all of the decisions and corresponding reasoning the compiler has made in order to select a particular type.

Referring again to FIG. 3, the decision data generated during compilation of the various tests is exposed and/or otherwise provided to a test framework at 330. Referring to FIG. 2, a process module 213 may process the internal decisions included in the decision data and provide the decisions to the test framework 204. For example, the internal decisions may be provided to the test framework 204 as metadata. Alternatively, the internal decisions may be provided to the test framework 204 in the form of messages.

At 335, the internal decisions made by the compiler are validated, for example based on a compiler specification. For example, referring to FIG. 2, a validation module 214 may invoke the test framework 204 to analyze the decision data and validate that any of the internal decisions made by the instrumented compiler correspond to a correct internal decision made with respect to the compiler specification. A compiler specification describes an explicit definition of the syntax and semantics of a particular programming language, and/or a valid description of the behavior of a translator (e.g. a compiler) for a particular programming language. Accordingly, the test framework may compare the output received from executing the instrumented compiler against one or more test cases to a compiler specification file including one or more valid internal decisions that the compiler may make to identify a match. When a match is identified, the test framework may indicate that the internal decision made by the compiler is correct.

In one particular embodiment, in order to validate the internal decisions made by the compiler, each test compiled by the compiler may include various markings, comments, annotations, etc., that provide additional information about the test that may be processed and/otherwise analyzed by the test harness 205 of the test framework 203. An annotation is a form of syntactic metadata that can be added to the source code of various programming languages. For example, the test harness 205 may process annotations provided in a test for performing overload resolution and subsequently compare the annotations against decision data generated by the compiler 103 when compiling the test. Consider, for example, a test A for performing overload resolution written in Java:

```
class Test A {
    void m(Object o) { }
    void m(Number i) { }
    void m(Integer i) { }
    void test( ) { m(1); }
}
```

Each of the overload candidates (i.e. the method declarations) within the test A may be decorated with annotations and/or otherwise marked, resulting in for example test A':

```
class Test A' {
    @Candidate(applicable=BOX)
    void m(Object o) { }
    @Candidate(applicable=BOX)
    void m(Number i) { }
    @Candidate(applicable=BOX, mostSpecific=true)
    void m(Integer i) { }
    { m(1); }
}
```

Each "@Candidate" annotation is used to indicate to the test harness 203 as to whether the method should be considered as applicable (and if so, in which phases). Additionally, each annotation may also be used to indicate the expected most specific method. Accordingly, the test harness 205 may process the @Candidate annotations by checking the contents of each respective annotation against the decision data generated by the compiler 103 when compiling test A'. For example, the test harness 205 and/or the test framework 203 may check that any internal decisions related to identifying a specific method call included in the decision data generated by the compiler 103 when compiling test A' corresponds to the method declaration annotated with a @Candidate annotation whose mostSpecific attribute is set to true.

The validation module 214 may provide the results from the execution of the various tests to a user. For example, the output module 214 may provide the decision data and test results as output for display on the one or more user devices 104-106. Alternatively, the validation module 214 may store the generated output in the database 220, for example, as a data record.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various exemplary embodiments, it will be understood that these embodiments are illustrative and that the scope of the disclosure is not limited to them. Many variations, modifications, additions, and improvements are possible. More generally, embodiments in accordance with the present disclosure have been described in the context of exemplary implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for testing a compiler comprising:
generating, using at least one processor, decision data by compiling at least one test program using an instrumented compiler, the decision data corresponding to at least one internal decision made by the instrumented compiler during compilation;
wherein the decision data comprises information articulating the at least one internal decision and information describing why the at least one internal decision was made by the instrumented compiler; and
executing, using the at least one processor, at test framework to validate the at least one internal decision.

2. The method of claim 1 further comprising providing, at the at least one processor, the decision data to the test framework by exposing the decision data to the test framework as metadata.

3. The method of claim 1, wherein the test program is a program to test overload resolution decisions made by the instrumented compiler.

4. The method of claim 1, wherein the test program is a program to test type-inferencing decisions made by the instrumented compiler.

5. The method of claim 1, wherein validating the at least one internal decision comprises comparing the at least one internal decision to a plurality of valid internal decisions of a compiler specification file to identify a match.

6. The method of claim 1, wherein the test framework includes a test harness, the at least one test program is annotated and wherein invoking the test framework to validate the at least one internal decision comprises invoking the test harness to compare the at least one internal decision to contents of the annotations to validate the at least one internal decision.

7. A system for testing a compiler comprising:
a memory; and
at least on processor to:
generate decision data by compiling at least one test program using an instrumented complier, the decision data corresponding to at least one internal decision made by the instrumented compiler during compilation;

wherein the decision data comprises information articulating the at least one internal decision and information describing why the at least one internal decision was made by the instrumented compiler; and execute a test framework to validate the at least one internal decision.

8. The system of claim 7, further wherein the at least one processor is further configured to provide the decision data to the test framework by exposing the decision data to the test framework as metadata.

9. The system of claim 7, wherein the test program is a program to test overload resolution decisions made by the compiler.

10. The method of claim 1, wherein the test program is a program to test type-inferencing decisions made by the instrumented compiler.

11. The system of claim 7, to validate the at least one internal decision comprises comparing the at least one internal decision to a plurality of valid internal decisions of a compiler specification file to identify a match.

12. The system of claim 7, wherein the test framework includes a test harness, the at least one test program is annotated and wherein invoking the test framework to validate the at least one internal decision comprises invoking the test harness to compare the at least one internal decision to contents of the annotations to validate the at least one internal decision.

13. A non-transitory computer readable medium encoded with a compilation application comprising modules executable by a processor, the modules comprising:

a test module to generate decision data by compiling at least one test program using an instrumented compiler, the decision data corresponding to at least one internal decision made by the instrumented compiler during compilation;

wherein the decision data comprises information articulating the at least one internal decision and information describing why the at least one internal decision was made by the instrumented compiler; and a validation module to execute a test framework to validate the at least one internal decision.

14. The non-transitory computer readable medium of claim 13, further comprising a process module to provide the decision data to the test framework by exposing the decision data to the test framework as metadata.

15. The non-transitory computer readable medium of claim 13, wherein the test program is a program to test type-inferencing decisions made by the compiler.

16. The non-transitory computer readable medium of claim 13, wherein the test program is a program to test overload resolution decisions made by the instrumented compiler.

17. The non-transitory computer readable medium of claim 13, wherein to validate the at least one internal decision comprises comparing the at least one internal decision to a plurality of valid internal decisions of a compiler specification file to identify a match.

18. The non-transitory computer readable medium of claim 13, wherein the test framework includes a test harness, the at least one test program is annotated and wherein invoking the test framework to validate the at least one internal decision comprises invoking the test harness to compare the at least one internal decision to contents of the annotations to validate the at least one internal decision.

* * * * *

UNITED STATES PATENT AND TRADEMARK OFFICE
CERTIFICATE OF CORRECTION

PATENT NO. : 8,881,126 B2  
APPLICATION NO. : 13/562915  
DATED : November 4, 2014  
INVENTOR(S) : Brian Goetz et al.

Page 1 of 1

It is certified that error appears in the above-identified patent and that said Letters Patent is hereby corrected as shown below:

In the Claims

In claim 7
- column 10, line 65, delete "on" and replace with -- one --;
- column 10, line 67, delete "complier" and replace with -- compiler --.

Signed and Sealed this
Tenth Day of March, 2015

Michelle K. Lee
*Deputy Director of the United States Patent and Trademark Office*

UNITED STATES PATENT AND TRADEMARK OFFICE
CERTIFICATE OF CORRECTION

PATENT NO.          : 8,881,126 B2
APPLICATION NO.     : 13/562915
DATED               : November 4, 2014
INVENTOR(S)         : Goetz et al.

It is certified that error appears in the above-identified patent and that said Letters Patent is hereby corrected as shown below:

In the Specification

In column 2, line 60, delete ""golden file,"" and insert -- "golden file" --, therefor.

In the Claims

In column 10, line 40, in Claim 1, delete "at" (2nd occurrence) and insert -- a --, therefor.

Signed and Sealed this
Seventh Day of July, 2015

Michelle K. Lee
*Director of the United States Patent and Trademark Office*